United States Patent
Huang et al.

(10) Patent No.: US 9,135,720 B2
(45) Date of Patent: Sep. 15, 2015

(54) CONTENT-BASED ASPECT RATIO DETECTION

(71) Applicant: STMicroelectronics Asia Pacific PTE, Ltd., Singapore (SG)

(72) Inventors: Yong Huang, Singapore (SG); Lucas Hui, Singapore (SG)

(73) Assignee: STMICROELECTRONICS ASIA PACIFIC PTE. LTD., Singapore (SG)

( * ) Notice: Subject to any disclaimer, the term of this patent is extended or adjusted under 35 U.S.C. 154(b) by 262 days.

(21) Appl. No.: 13/851,807

(22) Filed: Mar. 27, 2013

(65) Prior Publication Data

US 2014/0294307 A1    Oct. 2, 2014

(51) Int. Cl.
| | |
|---|---|
| G06K 9/46 | (2006.01) |
| G06T 7/60 | (2006.01) |
| H04N 5/262 | (2006.01) |

(52) U.S. Cl.
CPC .............. *G06T 7/602* (2013.01); *H04N 5/2628* (2013.01); *G06T 2207/10016* (2013.01); *G06T 2207/20052* (2013.01); *G06T 2207/20056* (2013.01)

(58) Field of Classification Search
CPC .......... G06T 3/00; G06T 3/40; H04N 7/0125; H04N 7/0122
USPC ............... 348/441, 445, 459, 403.1, 556, 558
See application file for complete search history.

(56) References Cited

U.S. PATENT DOCUMENTS

| | | | |
|---|---|---|---|
| 5,627,592 A * | 5/1997 | Tichelaar et al. | 348/429.1 |
| 6,366,706 B1 | 4/2002 | Weitbruch | |
| 6,788,347 B1 * | 9/2004 | Kim et al. | 348/441 |
| 6,947,097 B1 * | 9/2005 | Joanblanq | 348/558 |
| 7,187,415 B2 * | 3/2007 | Arora | 348/445 |
| 2004/0114049 A1 | 6/2004 | Arora | |
| 2009/0103812 A1 * | 4/2009 | Diggins | 382/191 |
| 2011/0019096 A1 * | 1/2011 | Lee et al. | 348/607 |

OTHER PUBLICATIONS

Ali Bani-Hashemi, "Finding the Aspect-Ratio of an Imaging System", IEEE, 1991, pp. 122-125, as applied to claim 7 above and further in view of Lee et al. (US Publication 2011/0019096).*
Saeed V. Vaseghi, "Power Spectrum And Correlation", Advanced Digital Signal Processing and Noise Reduction, second edition, 2000, pp. 263-296.*

* cited by examiner

*Primary Examiner* — Samir Ahmed
(74) *Attorney, Agent, or Firm* — Allen, Dyer, Doppelt, Milbrath & Gilchrist, P.A.

(57) ABSTRACT

A system for determining an aspect ratio of image content based on an analysis of the content. In an embodiment, an analyzer is configured to receive a data input corresponding to an image in a stream of images that constitute a video sequence of images. The analyzer is further configured to determine a mathematical representation of the image content based on a power spectrum analysis of vertical components of the image in comparison to a power spectrum analysis of horizontal components of the image. Based on this comparison of the vertical frequency components to the horizontal frequency components, a determination about the original aspect ratio of the image may be determined. This determination may be used by a video processor to correctly apply aspect ratio conversion for final image output.

10 Claims, 5 Drawing Sheets

CONTENT-BASED ASPECT RATIO DETECTION

BACKGROUND

Video image content typically includes an aspect ratio which, in simple terms, is a ratio of the size of the video in vertical measurement to the size of the video content in horizontal measurement. Typical aspect ratios may include 4:3 which corresponds to most legacy televisions (e.g., SD (Standard Definition)) and 16:9 which corresponds to common high-definition (HD) displays. There are other aspect ratios in use, but other aspect ratios are not very common. Because of different aspect ratios in use across different devices, is very common for consumer devices to convert an image at one aspect ratio to an image at another aspect ratio, so that an image that has one aspect ratio can be displayed on a display (or within an area within a display, such as picture in picture) that may have a different aspect ratio.

With various aspect ratios in use, it is common that various algorithms used in various devices often apply a conversion with any analysis about the image itself. Rather, assumptions are often made about the origin of an image without regard to any additional processing or manipulation. Thus, a device may apply a conversion algorithm to an image already converted once before. Without analyzing the actual image content, initial distortions in incorrect aspect ratio go undetected. Therefore, the prior art devices cannot detect such distortion, and will just assume that the proper aspect ratio for this image is different, and therefore, will blindly apply aspect ratio detection despite the image being distorted with which to begin.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description.

The present disclosure is not intended to be limited to the embodiments shown, but is to be accorded the widest scope consistent with the principles and features disclosed or suggested herein.

The subject matter disclosed herein is related to a system and method for determining an aspect ratio of image content based on an analysis of the underlying content itself. In an embodiment, an aspect ratio analyzer is configured to receive a data input corresponding to an image in a stream of images that constitute a video sequence of images. The analyzer is further configured to determine a mathematical representation of the image content based on a power spectrum analysis of vertical components of the image in comparison to a power spectrum analysis of horizontal components of the image. Based on this comparison of the vertical frequency components to the horizontal frequency components, a determination about the original aspect ratio of the image may be determined. This determination may be used by a video processor to correctly apply aspect ratio conversion for final image output.

In this manner, images that may have previously been incorrectly stored with the wrong aspect ratio may be correctly stored or displayed using the correct aspect ratio regardless of any meta data stored with the image. That is, instead of relying on meta data for identifying an aspect ratio and assuming the associated aspect ratio in the meta data is correct, the system and method described herein may actually determine the correct aspect ratio via a frequency analysis of the actual image. These advantages and other aspects of the system and methods are described in various embodiments below with respect to the figures.

Figure 1:
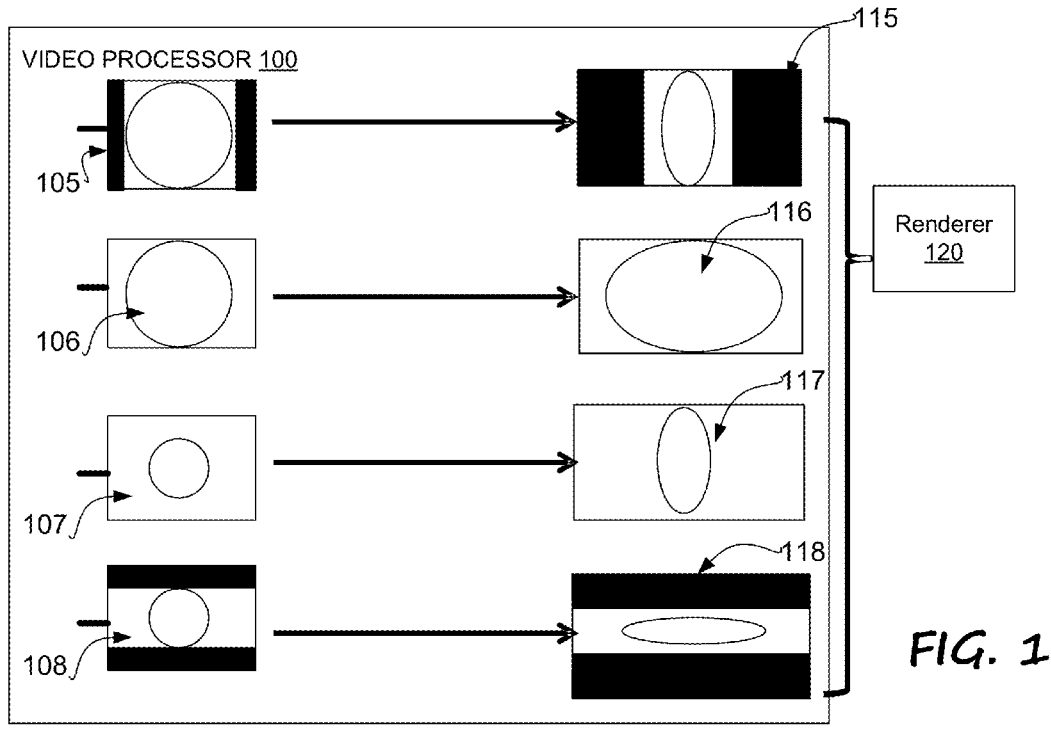
FIG. 1 shows a diagrammatic representation of problems that are prevalent with systems that do not use content-based analysis in determining an aspect ratio for rendering images on a display.

Turning to the figures, FIG. 1 shows a diagrammatic representation of problems that are prevalent with systems that do not use content-based analysis in determining an aspect ratio for rendering images on a display. In this representation, a video processor 100 (that may be part of a set-top box or other device which is not shown in FIG. 1) may receive video input data (i.e., data typically in the form of a series of sequential images). Further, the received data may include information related to an aspect ratio of images in the video data stream. That is, information in the data stream will typically indicate the ratio of the horizontal dimension of the images in the video data stream to the vertical dimension of the images in the video data stream. For the remainder of this description, the systems and methods herein will describe manipulation of a single image which is within the context of a sequence of images that may form video content. Thus, an aspect ratio corresponding to one video image in the video stream may refer to an aspect ratio for the entire data stream of images.

As users of different devices receive an image created for use across multiple device specifications and platforms, the image is often resized to accommodate the device upon which the image is rendered. For example, a set top box for use with typical televisions may receive an image that exhibits an HD aspect ratio (16:9), but then convert this image to a SD aspect ratio (4:3) for display on a standard television set. Such set top boxes may be used by people who continue to use a standard television set, but who receive high definition television signals, such as via cable or satellite. Further, lap-top computers, smart phones, computer monitors, and tablet computers may also have display screens that correspond to aspect ratios that are different from HD and would benefit from a resizing. As another example, there are times when SD video images with and SD aspect ratio may be resized to fit a larger display that is suited for HD video images. To this end, there are times that an image with a different aspect ratio than the display upon which the image is to be rendered may be appended with pillar boxes (e.g., black boxes on the left and the right of the image or appended with letter boxes (e.g., black boxes on the top side and the bottom side of the image). Further yet, storing, copying, transmitting and receiving of images may lead to distortion to the underlying image of an incorrect aspect ratio manipulation had previously been administered.

Some systems, such as the system shown in FIG. 1, however, when blindly applying a resizing algorithm, may resize an image to the detriment of the image since some images may be initially sent with pillar boxes or letter boxes already added to the image content. Thus, devices that do not analyze the actual content of the images may receive images that are initially designated with a specific aspect ratio and apply an algorithm regardless of whether a previous aspect ratio conversion was already accomplished. As such, when converting from SD to HD or HD to SD, often a simple conversion algorithm may suffice, so long as certain assumptions about the received video images are met, such as the existence or non-existence of pillar boxes or letter boxes.

By way of some examples, an SD image 105 may be received at the device 100 of FIG. 1 with data therein designating the image as SD. In this example, the SD image 105 may be received with a designation as SD, but with pillar boxes already added. The device 100 will interpret the SD aspect ratio as needing pillar boxes added and therefore, the underlying image (e.g., the circle which is used to show the effects of improper aspect ratio resizing) is then squeezed horizontally as additional pillar boxes are added as shown in the improperly sized image 115.

In a similar manner, if an SD image 106 is received without pillar boxes and the device 100 assumes that the pillar boxes have already been added, then, the device may blindly apply an algorithm to change the aspect ratio of the underlying image, but then not add the pillar boxes (e.g., essentially zooming in on the image at different ratios with respect to vertical versus horizontal). The resulting assumption error then results in a stretched image in the horizontal direction as shown in image 116.

In continuing with these examples, an HD image 107 may be received at the device 100 of FIG. 1 with data therein designating the image as HD. In this third example, the HD image 107 may be received with a designation as HD widescreen, but with letter boxes not yet added. The device 100 may interpret the HD widescreen aspect ratio as needing pillar boxes added and therefore, the underlying image (e.g., the circle which is used to show the effects of improper aspect ratio resizing) is then squeezed vertically as letter boxes were incorrectly assumed resulting in the improperly sized image 117.

Lastly, in these examples, if an HD-widescreen image 108 is received with letter boxes and the device 100 assumes that the letter boxes have yet to be added, then, the device may blindly apply an algorithm to change the aspect ratio of the underlying image, but then add additional letter boxes (e.g., essentially zooming in on the image at different ratios with respect to vertical versus horizontal). The resulting assumption error then results in a distorted image in the vertical direction as shown in image 118.

In each of these examples, the incorrect image will be sent to renderer 120 for displaying on a display or saving to a memory. The above examples show how proper conversion from one aspect ratio to another aspect ratio is important to preserve the content of the image without distortion. However, relying on the information stored with the image when received still does not prevent rendering errors due to variations across multiple device operating in multiple platforms. Further, the assumptions of some devices at to the presence of lack thereof of pillar boxes or letter boxes may lead to an incorrect application of a resizing algorithm which will result on a distortion of the underlying image.

Figure 2:
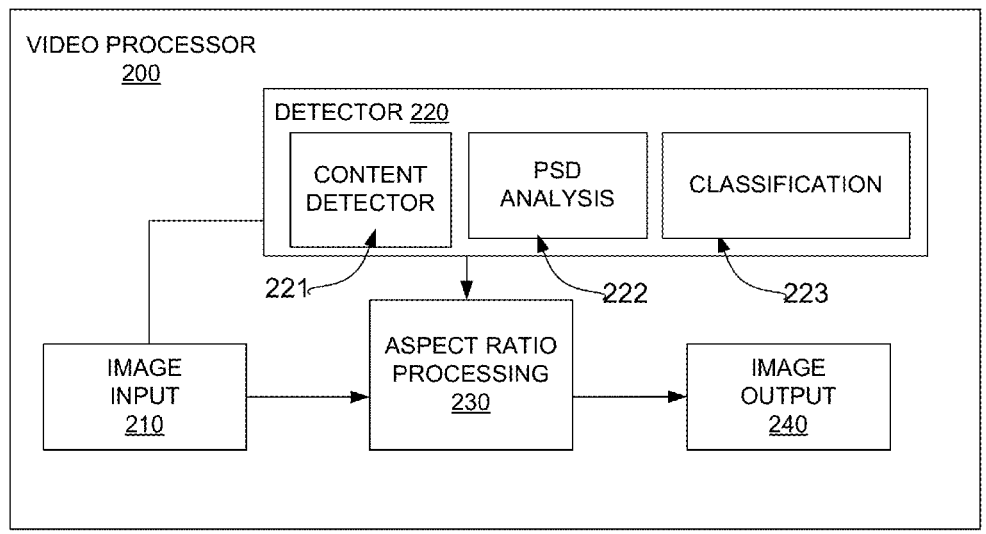
FIG. 2 is a block diagram of a system that is capable of correctly assessing the aspect ratio of images received and applying proper aspect ratio processing to the images in order to correctly display the images without distortion according to an embodiment of the subject matter disclosed herein.

FIG. 2 is a block diagram of a system 200 that is capable of correctly assessing the aspect ratio of images received and applying proper aspect ratio processing to the images in order to correctly display the images without distortion according to an embodiment of the subject matter disclosed herein. In this embodiment, images that may typically be part of a stream of video images are received at an image input 210. Such an image may be received at a receiver that is part of the system 200. The images received may include meta data about an inherent aspect ratio and may or may not include additional information such as the presence (or lack thereof) of pillar boxes or letter boxes. In this system 200, however, any information about the particular aspect ratio may be ignored initially as a determination can be made about the inherent aspect ratio by analyzing the content of the image itself instead of relying on meta data about the image.

Thus, the received image may then be sent to a calculator block called an aspect ratio detector 220 as well as an aspect ratio processing block 230. The aspect ratio detector 220 applies a frequency analysis algorithm (which is described in greater detail below with respect to FIGS. 3-11) to the content of the image received to determine the average spatial frequency across the horizontal and vertical directions. In this embodiment, the algorithm includes three stages including a first stage for active image detection 221, a second stage for power spectral density analysis and aspect ratio estimation 222, and a third stage for aspect ratio classification 223 based on the aspect ratio estimation. Based on this analysis, the aspect ratio detector 220 may determine the correct aspect ratio of underlying image content. Thus, by inputting this analysis conclusion to the aspect ratio processing block 230, the image may be altered if the determined aspect ratio is not the aspect ratio desired for output. Once the image is placed into the correct aspect ratio for output (if not already in the correct aspect ratio), the image may be passed to an image output block 240 for rendering or saving.

Figure 3:
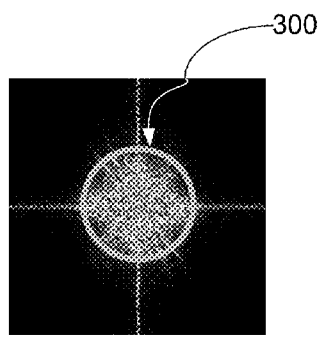
FIGS. 3-5 are plot diagrams of a frequency analysis for three examples of image exhibiting a specific aspect ratio according to an embodiment of the subject matter disclosed herein.
Figure 4:
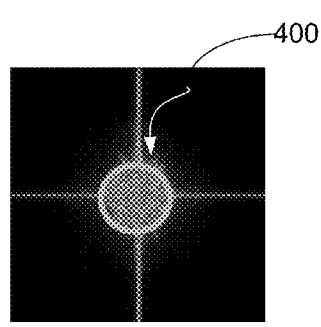
Figure 5:
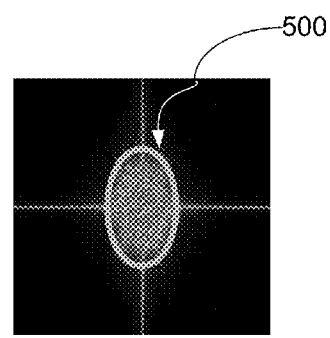

FIGS. 3-5 are plot diagrams of a two-dimensional power spectral density (PSD) for three examples of image exhibiting a specific aspect ratio according to an embodiment of the subject matter disclosed herein. The plots in these figures help explain why the mathematical analysis can determine whether or not the underlying image has the correct aspect ratio. Generally speaking, by performing the analysis according to the methods and systems described below, one can expect a plot of the analysis results (horizontal pixels vs. vertical pixels) to exhibit a distribution about the origin in a uniform manner. That is, the distribution in a horizontal direction will be roughly equivalent to the distribution in the vertical direction.

Thus, one can see in FIG. 3, the power spectral density may be enclosed by a substantially uniform circle 300. In this plot, the underlying image is an HD image wherein the PSD is evenly distributed in the vertical vs. horizontal direction and this indicates that the current aspect ratio for this image is correct. Similarly, in FIG. 4, one can see that the plot of the power spectral density may also be enclosed by a substantially uniform circle 400, albeit smaller than the circle 300 as this plot represents an SD image.

However, if the underlying image exhibits an incorrect aspect ratio with which to begin, the PSD distribution will reveal a ratio of the horizontal plot against the vertical plot to be something other than 1:1. That is, as seen in FIG. 5, an elliptical plot 500 is formed. The underlying image of FIG. 5 may have an SD (4:3) aspect ratio, but it has been stretched out, and thus distorted, in the horizontal dimension to fit an HD (16:9) display. This stretching reduces the average spatial frequency in the horizontal dimension such that the PSD in the horizontal dimension is compressed i.e., is not as wide as the PSD spread in the vertical dimension. Therefore, one can see that the two dimensional PSD in this case has an elliptical shape 500 with its major axis in the vertical dimension, which indicates distortion of the image in the horizontal dimension. Effectively, the width in the horizontal dimension of the PSD is inversely proportional to the amount that the image is stretched. So the more the image is stretched, the thinner the plot of the PSD will be in the horizontal dimension, so that as one stretches the image more in the horizontal direction, the ellipse becomes taller and thinner.

So one can glean from a frequency analysis yielding a PSD that the aspect ratio of an image that is in its proper aspect ratio if the two dimensional PSD results in a rather uniform circle. Mathematically, it means that the ratio of the vertical to the horizontal is approximately 1:1 because the diameter of the circle is the same in both dimensions. And one can see that even though of the size of the circle changes from the first image 300 to the second image 400, the ratio stays the same because the plot of the PSD is circular. The mathematical concepts underlying this overview are discussed further below along with a presentation of supporting mathematical equations.

Figure 6:
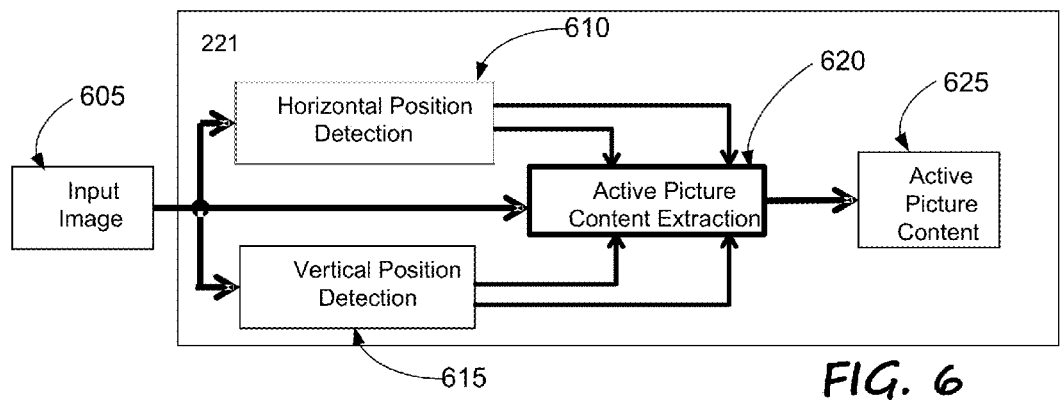
FIG. 6 is a block diagram of an algorithm to determine the active content of an image to be analyzed according to an embodiment of the subject matter disclosed herein.

FIG. 6 is a block diagram of an algorithm to determine the active content of an image to be analyzed according to an embodiment of the subject matter disclosed herein. Starting at the left of the diagram, an input image may be received by an image input block 605. At this point, the image received may be part of a series of images (e.g., video) initially received that exhibits an unknown aspect ratio. As was discussed previously, the image may have associated meta data that identifies an aspect ratio, but as was shown, such meta data may be misleading due to letter box and pillar box presence or lack thereof. Thus, in order to analyze the actual image (the image inside of pillar boxes or letter boxes), any pillar box or letter box will first be detected and subsequently ignored.

The received image is then passed to the active image detection stage 221 where the image is parsed by a horizontal detection block 610 and also parsed by a vertical detection block 615. This parsing may be done concurrently or sequentially.

The horizontal and vertical procedures accomplished by these blocks 610 and 615 determine the boundary in both the horizontal and vertical dimensions of the active region of the image. Thus, in the horizontal detection block 610, image data representing each horizontal line of the image is isolated and a parser calculates the mean and the variance of the luminance of the isolated horizontal line data using the luminance values for each pixel therein. If the first horizontal line is part of a letter box, then the mean will be zero (or very low due to noise) as well as the variance. This is because letter boxes are typically all black or some uniform single color.

The parsing continues for each subsequent horizontal line until the mean and variance becomes significantly larger than zero (or certain threshold), which can then be interpreted to mean that the line is no longer in the letter box area (e.g., no longer all black), but actually contains true image content. For the purposes of analyzing the actual content of the image later to determine an aspect ratio, it is this first image line that will be the boundary of the image on its top side. The horizontal detection block 610 continues to parse each horizontal line until the mean and the variance fall below a threshold associated with the first image line detected that was not part of the top-side letter box (e.g., the mean and the variance again fall back to substantially zero), which is an indication that the other letter box has been reached at the bottom of the image.

Similarly, in the vertical detection block 615, image data representing each vertical column of the image is isolated and a parser calculates the mean and the variance of the luminance of the isolated vertical column line using the luminance values for each pixel therein. If the first vertical column is part of a pillar box, then the mean and the variance will be substantially zero (or very low due to noise).

The parsing continues for each subsequent vertical column until the mean and variance becomes significantly larger than zero (or certain threshold), which can then be interpreted to mean that the column is no longer in the pillar box area (e.g., no longer all black), but actually contains true image content. For the purposes of analyzing the actual content of the image later to determine an aspect ratio, it is this first image column that will be the boundary of the image on its left side. The vertical detection block 610 continues to parse each vertical column until the mean and the variance fall below a threshold associated with the first image column detected that was not part of the left-side pillar box (e.g., the mean and the variance again fall back to substantially zero), which is an indication that the other pillar box has been reached at the right of the image.

It is typical that only a left-right pillar box will be detected or a top-bottom letter box as these characteristics are added to images to fill in either vertical display area or horizontal display area when different aspect ratios are needed or desired. However, on occasion, both letter boxes and pillar boxes may be present. The horizontal detection block 610 and the vertical detection block 615 may then pass this analysis to an active picture content extractor 620 where the horizontal lines or the vertical columns determined to have a zero mean and/or zero variance are then stripped away from the interim image to be analyzed. The active picture content 625 may then be passed to the PSD block 222 (FIG. 2 and FIG. 7).

In other embodiments, the horizontal detection block 610 and the vertical detection block 615 may also use the pixel chrominance values instead of pixel luminance to determine the means and the variances. In still further embodiments, these detection blocks 610 and 615 may use both luminance and chrominance values. The use of luminance and chrominance values is associated with YUV color space parameters. Other color space models may also be used. For example, in RGB color space, one calculation may be based on Green values of pixels instead of using luminance values. Similarly, the calculation may be based on R or B values of pixels instead of using chrominance values. Still further, the calculation may be based on the combination of R, G, and B values of pixels instead of using luminance and chrominance values together.

Figure 7:
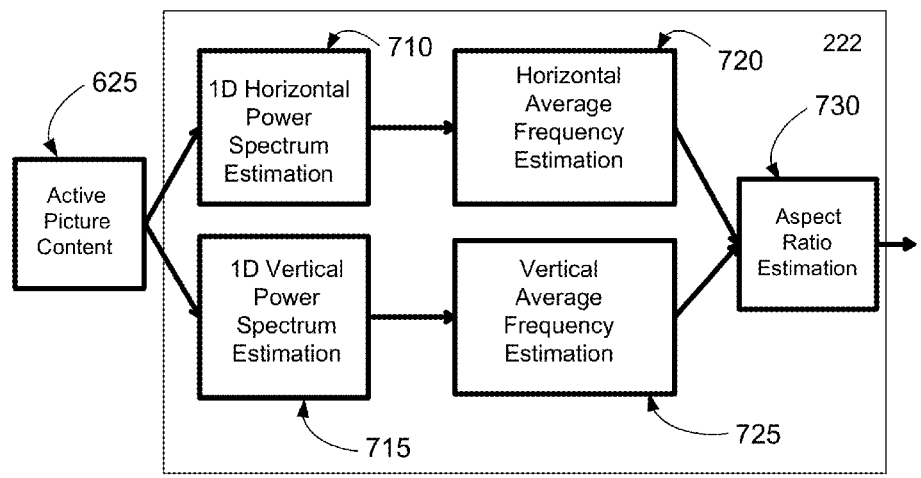
FIG. 7 is a block diagram of a one-dimensional PSD analysis algorithm to determine the power spectral density of an image to be analyzed according to an embodiment of the subject matter disclosed herein.

In any of these active picture detection methods, the active picture content 625 is now an interim image to be used for the PSD analysis to determine a native aspect ratio of the image without using any pillar box or letter box data as is next described in FIG. 7.

FIG. 7 is a block diagram of a one-dimensional PSD analysis algorithm to determine the power spectral density of an image according to an embodiment of the subject matter disclosed herein. In this diagram, the active picture content 625 (as determined from the procedure detailed with respect to FIG. 6) is passed to the PSD analysis block 222. The algorithm in FIG. 7 represents a one dimensional PSD analysis for both horizontal and vertical dimensions to determine the horizontal average spatial frequency and the vertical average spatial frequency. Thus, as a brief overview of FIG. 7 (as a mathematical detail of the aspects of FIG. 7 are presented with respect to FIG. 8 below), the image is transformed into a frequency domain (e.g., via a discrete Fourier transform (DFT), for example) from both the horizontal perspective 710 and the vertical perspective 715. Other transforms may also be used, such as a Discrete Cosine transform (DCT), wavelet transform, or integer transform—but only the DFT is discussed further herein. Then, once transformed, the horizontal average spatial frequency may be determined at block 720 and the vertical average spatial frequency may be determined at block 725. The horizontal average spatial frequency and the vertical average spatial frequency may then be compared to each other at block 730 to estimate the native aspect ratio of the active picture content. To delve further into the mathematical concepts underlying the block diagram of FIG. 7, a discussion surrounding the representation shown in FIG. 8 is presented.

Figure 8:
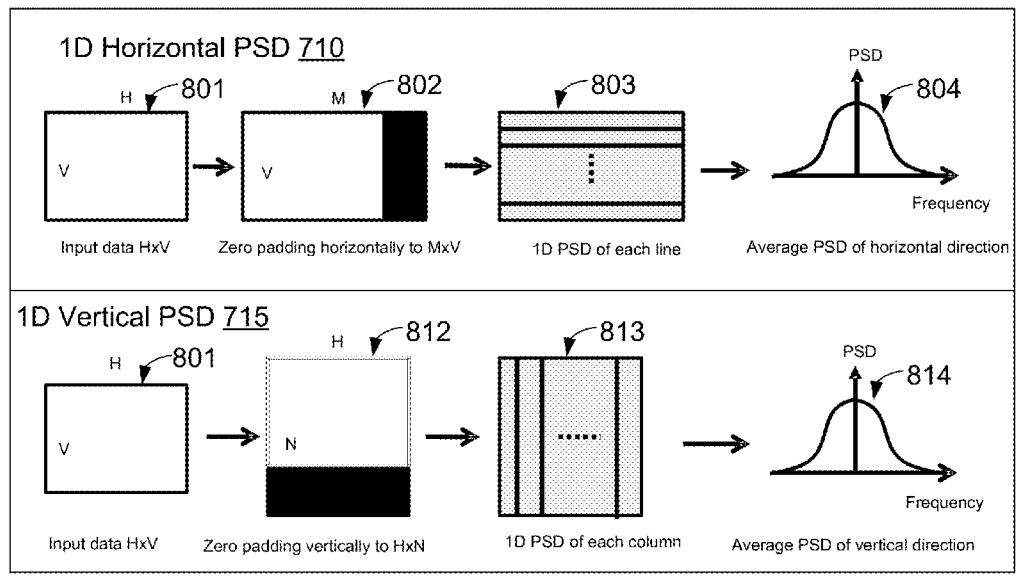
FIG. 8 is a mathematical representation of the one-dimensional spatial frequency analysis method of FIG. 7 according to an embodiment of the subject matter disclosed herein.

FIG. 8 is a mathematical representation of the one-dimensional spatial frequency analysis method of FIG. 7 according to an embodiment of the subject matter disclosed herein. As briefly mentioned above, the active picture content 801 is received as a data stream in an image domain having dimensions detected of H pixels in the horizontal dimension and V pixels in the vertical dimension to be used in determining the horizontal spatial frequency. Similarly, the active picture content 801 is also received as a data stream in an image domain having dimensions detected of H pixels in the horizontal dimension and V pixels in the vertical dimension to be used in determining the vertical spatial frequency. This may be done via DFT.

In this embodiment, one may create a specific hardware or software based DFT algorithm that can handle the specific number of determined horizontal lines and vertical columns. As is known, DFT manipulation is computationally intensive. However, one can take advantage of modern-day circuits or software that are typically suited to more easily handle such computational intensive manipulations if the dimensions used in the underlying image correspond to a number of points that is equal to a power of two. For example, a DFT that has 512 points, 1024 points, or 2048 points may take advantage of pipeline processing to more easily determine the DFT of an image-domain data stream. Thus, in images that have dimensions that are somewhat close to these values (e.g., values that are a function of the power of two) the method herein may pad the actual image content with one or more constant values. (e.g., zeros in this embodiment), to get the horizontal or vertical dimension equal to a power of two, or, more precisely, equal to the number of points in the DFT being used.

For example, if the real image has H=1000 pixels in the horizontal dimension, and one wishes to use a 1024 point DFT, then the active content image 801 may be padded at step 802 in the horizontal dimension with 24 additional points all having values of zero such that now the padded horizontal dimension M=1024 pixels e.g., the value of points in the horizontal DFT. Similarly, as represented at step 812, one may determine that V is less than the N value of the vertical DFT and pad V with a number of constant value points in order to equal the number of points N in the vertical DFT.

Then the padded image (or the real image if no padding is used) is subjected to a line by line and a column by column power spectral density analysis, and then the PSD and average frequencies in both the horizontal and vertical dimensions are calculated as described in more detail below.

In order to determine the PSD for each dimension, one conducts a spatial frequency transforms 803 and 813 of the each received image 801. In this embodiment, the frequency transform used for the horizontal and vertical algorithms is a Discrete Fourier Transform (OFT) as is shown in equations (1) and (2).

$$F_H(k) = \frac{1}{V}\sum_{v=0}^{V-1}\left(\frac{1}{M}\sum_{m=0}^{M-1} y(m,v)*e^{-j*2\pi*\left(\frac{m*k}{M}\right)}\right) \quad (1)$$

$$F_V(l) = \frac{1}{H}\sum_{h=0}^{H-1}\left(\frac{1}{N}\sum_{n=0}^{N-1} y(h,n)*e^{-j*2\pi*\left(\frac{n*l}{N}\right)}\right) \quad (2)$$

In the horizontal DFT equation (1), the horizontal frequency component for each harmonic k of the spatial frequency of the image in the horizontal dimension is determined. V is the number of pixels in the actual image in the vertical dimension and M is the number of pixels in the horizontal direction that are padded to the actual image content. Further, y is a function of m and v, and is the luminance value of the pixel located at coordinates m and v. Finally, k is the frequency harmonic. In this example, the frequency harmonic k has a range from zero to M−1, which corresponds to the Nyquist frequency with regard to real and imaginary DFT coefficients. As a result, the horizontal DFT equation (1) calculates a resultant value k times—one time for each value of k. This results in k=M values of $F_H(k)$.

In the vertical DFT equation (2), the vertical frequency component for each harmonic k of the spatial frequency of the image in the vertical dimension is determined. N is the number of pixels in the vertical dimension that are padded to the actual image content and H is the number of pixels in the horizontal direction. As above, y is a function of h and n, and is the luminance value of the pixel located at coordinates h and n. Similar to k for the horizontal DFT equation (1), l is the frequency harmonic for the vertical DFT equation (2). In this example, the harmonic l has a range from zero to N−1, which corresponds to the Nyquist frequency with regard to real and imaginary DFT coefficients. As a result, the vertical DFT equation (2) calculates a resultant value l times—one time for each value of l. This results in l=N values of $F_v(l)$. The average PSD of horizontal and vertical directions are shown in 804, 814 of FIG. 8.

As each line and column is transformed into the frequency domain, one then has M complex values for FH (k), and N complex values of Fv (l) wherein each nonzero frequency harmonic will result in a real part (e.g., FHr and FVr) and an imaginary part FHi and FVi. Then, one can calculate the respective horizontal PSO values for each k at step 803 by squaring the real part and the imaginary part and take the square root of the sum of these values as shown in the horizontal PSO equation (3). Likewise, one can calculate the respective vertical PSO values for each I at step 813 by squaring the real part and the imaginary part and take the square root of the sum of these values as shown in the vertical PSO equation (4).

$$P_H(k) = \sqrt{F_{Hr}(k)^2 + F_{Hi}(k)^2} \qquad (3)$$

$$P_V(l) = \sqrt{F_{Vr}(l)^2 + F_{Vi}(l)^2} \qquad (4)$$

Turning attention back to FIG. 7, having a PSD for every horizontal k and every vertical I, one can then determine the average horizontal frequency FH in equation (5) at step 720 and the average vertical frequency Fv in equation (6) at step 725.

$$F_H = \frac{M}{\max(M,N)} * \frac{\sum_{k=0}^{M/2-1} k * P_H(k)}{\sum_{k=0}^{M/2-1} P_H(k)} \qquad (5)$$

$$F_V = \frac{N}{\max(M,N)} * \frac{\sum_{l=0}^{N/2-1} l * P_V(l)}{\sum_{l=0}^{N/2-1} P_V(l)} \qquad (6)$$

In these equations, the first term is a normalization term. Furthermore, one can see that the summations go from k=0 to M/2−1, and from l=0 to N/2−1. This recognizes the Nyquist frequency as the maximum spatial frequency, in terms of the harmonic k or l, can only be half of the number of pixels because the maximum frequency would be where one pixel is high, the next pixel is low, the next pixel is high, the next pixel is low, and so on—which is the Nyquist frequency. Thus, one uses two samples per cycle to prevent aliasing. Therefore, recognizing the Nyquist limit for the spatial frequencies in the horizontal and vertical dimensions, one arrives at an overall average horizontal frequency $F_H$ and an average vertical frequency $F_V$ for the actual image content.

One can now calculate an estimated aspect ratio Re according to equation (7) at block 730.

$$R_e = \frac{H * F_V}{V * F_H} \qquad (7)$$

This ratio comprises the average vertical frequency times the number or horizontal lines H against average horizontal frequency times the number or vertical lines V. If the actual image content was received in its native aspect ratio then $R_e$ should equal approximately 1. This can then be interpreted to mean that the estimated aspect ratio actually corresponds to H/V which is the aspect ratio in which the image was received. However, if $R_e$ is significantly different than 1, then this can be interpreted to mean that the estimated aspect ratio is different from the aspect ratio in which the image was received because of distortion typically caused by a conversion of the image from its native aspect ratio to another aspect ratio. As will be discussed further below, the actual ratio $R_e$ may be further classified in a specific aspect ratio category to conclude what the proper aspect ratio should be. This is discussed in greater detail below with respect to FIG. 11.

Before discussing the classification of the estimated aspect ratio, an alternative embodiment for calculating the estimated aspect ratio is discussed next with respect to FIGS. 9 and 10.

Figure 9:
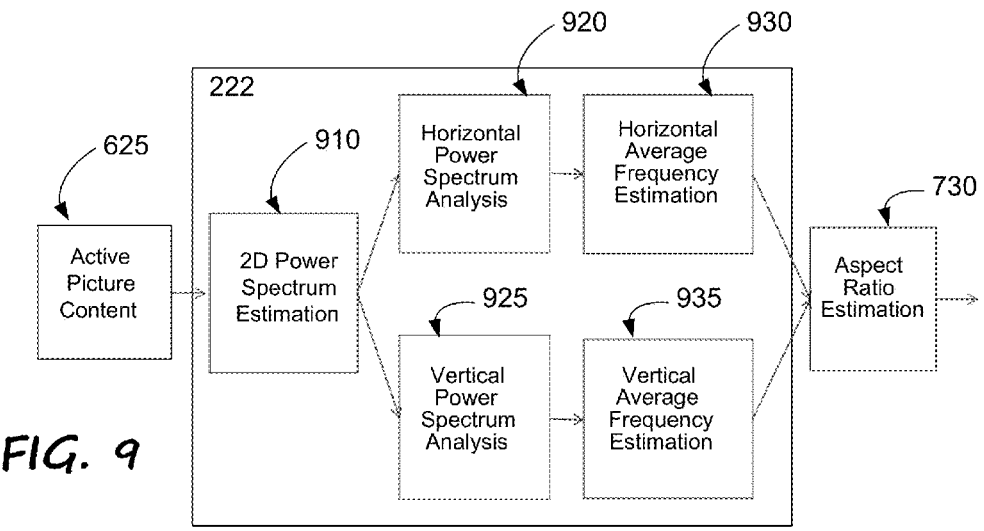
FIG. 9 is a block diagram of a two-dimensional PSD analysis algorithm to determine the power spectral density of an image to be analyzed according to an embodiment of the subject matter disclosed herein.

FIG. 9 is a block diagram of a two-dimensional PSD analysis algorithm to determine the power spectral density of an image according to an embodiment of the subject matter disclosed herein. This two-dimensional PSD analysis algorithm can be an alternative embodiment to the algorithm discussed with respect to FIGS. 7 and 8. In this embodiment, the active picture content 625 (as determined from the procedure detailed with respect to FIG. 6) is passed to the PSD analysis block 222. The algorithm in FIG. 9 represents a two dimensional PSD analysis to determine the horizontal average spatial frequency and the vertical average spatial frequency. Thus, as a brief overview of FIG. 9 (as a mathematical detail of the aspects of FIG. 9 are presented with respect to FIG. 10 below), the image is transformed into a frequency domain (e.g., via a discrete Fourier transform) simultaneously with the horizontal and vertical perspectives 910. Then, once transformed, the horizontal 920 and vertical 925 power spectrums may be calculated from the single transform from block 910. Then, the horizontal average spatial frequency may be determined at block 930 and the vertical average spatial frequency may be determined at block 935. The horizontal average spatial frequency and the vertical average spatial frequency may then be compared to each other at block 730 to estimate the native aspect ratio of the active picture content. To delve further into the mathematical concepts underlying the block diagram of FIG. 9, a discussion surrounding the representation shown in FIG. 10 is presented.

Figure 10:
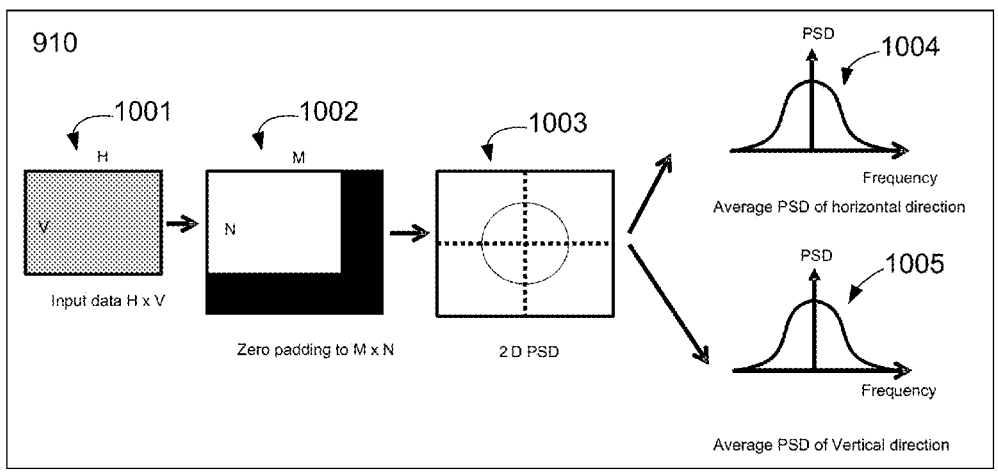
FIG. 10 is a mathematical representation of the two-dimensional spatial frequency analysis method of FIG. 9 according to an embodiment of the subject matter disclosed herein.

FIG. 10 is a mathematical representation of the two-dimensional spatial frequency analysis method of FIG. 9 according to an embodiment of the subject matter disclosed herein. As before, the active picture content 1001 is received as a data stream in an image domain having dimensions detected of H pixels in the horizontal dimension and V pixels in the vertical dimension to be used in determining the two-dimensional spatial frequency.

In order to determine the two-dimensional PSD, one conducts a spatial frequency transforms at step 1002. In this embodiment, the frequency transform used for the horizontal and vertical algorithms is again a Discrete Fourier Transform (OFT) as is shown in equations (8).

$$F(k,l) = \frac{1}{\sqrt{M*N}} \sum_{n=0}^{N-1} \sum_{m=0}^{M-1} y(m,n) * e^{-j*2\pi*\left(\frac{m*k}{M} + \frac{n*i}{N}\right)} \qquad (8)$$

After each line and column is transformed into the frequency domain via the two-dimensional OFT equation (8), the resultant OFT includes M x N complex values wherein each non-zero frequency pair of harmonics will result in a real part (e.g., Fr) and an imaginary part (e.g., Fi). Then, for each respective pair of harmonics k and I, one can calculate, at step 1003, the two-dimensional PSO according to equation (9).

$$P(k,l) = \sqrt{F_r(k,l)^2 = F_i(k,l)^2} \qquad (9)$$

As before, the PSO may be calculated by squaring both the real portion Fr and the imaginary portion Fi, adding them together, and then taking the square root of this sum. Having a PSO for every pair of harmonics (horizontal k and vertical 1), one may then extract the PSO for each of the vertical and horizontal dimensions via equation (10) in step 1004 and equation (11) in step 1005.

$$P_H(k) = \frac{1}{N} \sum_{l=0}^{N-1} P(k, l) \quad (10)$$

$$P_V(l) = \frac{1}{M} \sum_{k=0}^{M-1} P(k, l) \quad (11)$$

Then, as before and turning attention back to FIG. 9, with $P_H(k)$ and $P_V(l)$, one can then determine the average horizontal frequency $F_H$ in equation (5) at step 930 and the average vertical frequency $F_V$ in equation (6) at step 935. Further, as will be described next, the estimated aspect ratio $R_e$ of equation (7) may be calculated at step 730 and used to classify the underlying actual image content.

Figure 11:
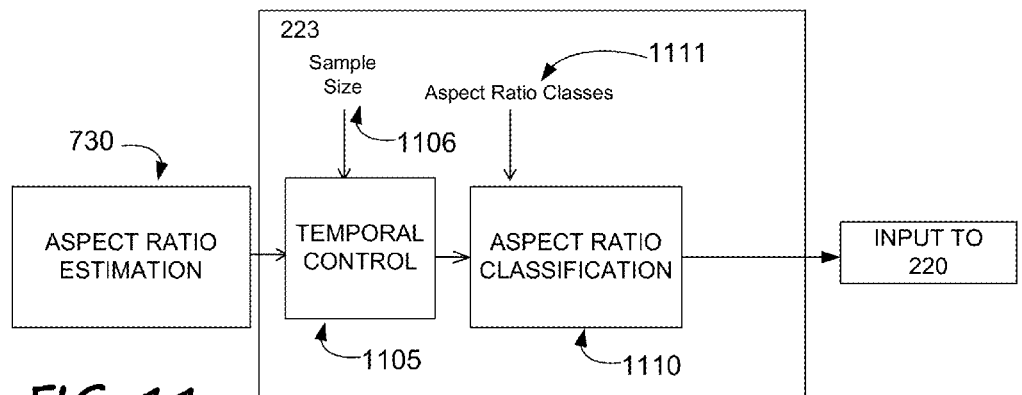
FIG. 11 is a block diagram of an embodiment aspect ratio classification block that may be part of the system of FIG. 2.

FIG. 11 is a block diagram of an embodiment aspect ratio classification block 223 that may be part of the system of FIG. 2. Once an aspect ratio estimation 730 has been determined per any one of the above-described methods, the aspect ratio classification block 223 may then make decisions as to how to interpret the estimated aspect ratio. As discussed above, the estimated aspect ratio 730 will be a real number indicating the ratio between the average spatial frequency of the horizontal aspect on underlying active image content against the average spatial frequency of the vertical aspect of the actual image content. As alluded to previously, if this ratio is 1:1 or close to it, then the aspect ratio classification block 1110 may interpret the original aspect ratio of the underlying active image content to be correct. That is, if the active image content is already in one of the more common aspect ratios (e.g., 1.33:1 for SD, 1.78:1 for HD, or 2.39:1 for widescreen), then the aspect ratio classification block 223 provides an input to the aspect ratio processor 220 (FIG. 2) to take no different action that normal aspect ratio processing.

However, if the estimated aspect ratio is not close to 1:1, then the aspect ratio classification block 1110 makes a logical decision to interpret the aspect ratio of the active image content from the estimated aspect ratio. For example, the aspect ratio classification block may have ranges by which a determination is made. Thus, if the estimated aspect ratio falls between 1.00 and 1.2, the aspect ratio classification block 1110 may interpret this to mean that the correct aspect ratio is already present. If the estimated aspect ratio falls between 1.20 and 1.44, the aspect ratio classification block 1110 may interpret this to mean that the correct aspect ratio is 4:3 (which corresponds to 1.33:1 (SD) when normalized as 1.33 is roughly equidistant from the two limits). Similarly, in this example, if the estimated aspect ratio falls between 1.44 and 2.05, the aspect ratio classification block 1110 may interpret this to mean that the correct aspect ratio is 16:9 (which corresponds to 1.78:1 (HD) when normalized). Lastly, in this example, if the estimated aspect ratio falls above. 2.05, the aspect ratio classification block 1110 may interpret this to mean that the correct aspect ratio is 2.39:1 for widescreen.

Additional classification may be used as well. For example, some theatres use a 1.85:1 aspect ratio that is slightly wider than the HD standard but not as wide as common widescreen. Further, CinemaScope™ is a standard that provides for a more enveloping movie experience has an aspect ratio of 2.66:1. However, for common set-top devices and most consumer level displays, the initially described three different aspect ratios may suffice most almost all common conversion situations. To this end, a specific array of classification may be input 1111 to the aspect ratio classification block 1110 for establishing the overall scheme to which these classification decisions are subjected.

Thus, if the aspect ratio classification block 1110 classifies the active image content as having a different aspect ratio that the one in which it was received, then this classification may alter how the aspect ratio processing block 220 (FIG. 2) handles aspect ratio changes for the received images.

Additionally, the aspect ratio classification stage 223 may also include a temporal control block 1105 for handling a series of images in a video stream. This allows the decision from the classification block 1110 to provide a classification based upon an average estimated aspect ratio over a number of images in a series of images. The number of images in a particular subset may be set by a Sample Size 1106. For example, the number of images (i.e., frames) analyzed may be 20 or 50 or any suitable number that is determined to give an accurate result. This may be useful if, for example, the video stream starts out with images of a certain aspect ratio and then switches over to images of another aspect ratio. If the device 200 is consistently checking and analyzing the frames across a sample size to detect if the aspect ratio, then the device 200 is able to alternate and adjust any aspect ratio correction to make sure that video images with the correct aspect ratio are displayed despite changes in the stream itself.

Figure 12:
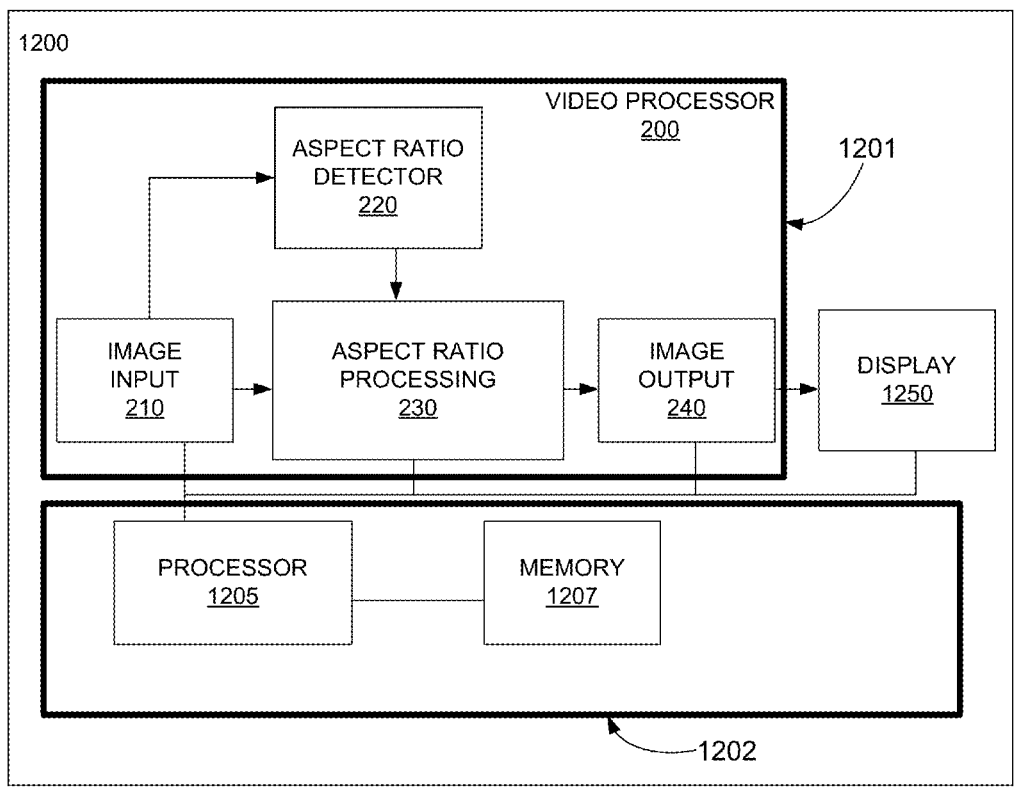
FIG. 12 is a block diagram of a system having an aspect ratio detector according to embodiments described herein.

FIG. 12 is a block diagram of a system 1200 having an aspect ratio detector 220 according to embodiments described herein. The system 1200 may include the video processor 200 of FIG. 2 which, in turn, includes the aspect ratio detector 220. The video processor 200 may be disposed on a single integrated circuit die 1201 that is part of the system. Further, the video processor 200 may be coupled to a system processor 1205 which may further be coupled to a memory 1207. The system processor 1205 and the memory 1207 may be disposed on a second integrated circuit die. In other embodiments, the integrated circuits 1201 and 1202 may be disposed on the same integrated circuit die. Further yet, the system 1200 may include a display coupled to the video processor 200 and coupled to the system processor 1205.

The system 1200 may be a television set-top box, a satellite receiver, a smart device (e.g., lap-top computer, desktop computer, tablet, smart phone, etc.), digital camera or any other computing device suited to process image data.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A video imaging system, comprising:
a receiver having a signal input for receiving an image having content including horizontal and vertical line pillar boxes data;
a processor to determine an aspect ratio of the content of the received image including an image detection circuit configured to parse the image for each horizontal line and vertical line by determining a mean and variance of each pixel luminance and chrominance values of the horizontal line and the vertical line and determine an active content area of the image;
an estimation circuit configured to extract each one dimensional power spectral density in the horizontal and the vertical dimensions for the active content of the image using a Discrete Fourier Transform (DFT) and estimate an aspect ratio for the image;
a classifier circuit configured to classify the estimated aspect ratio as one of plurality of standardized aspect ratios for the image; and
an output circuit configured to alter the aspect ratio of the received image based on the estimation aspect ratio of the content of the image.

2. The system of claim 1, wherein the processor further comprises a content detector circuit configured to detect the active content in the received image and to remove the pillar box data from the received image that is not part of the active image content.

3. The system of claim 1, wherein the estimation circuit is configured to transform the active content of the received image from a first domain to a second domain.

4. The system of claim 3, wherein the estimation circuit further comprises a Discrete Cosine Transform circuit.

5. The system of claim 3, wherein the estimation circuit further comprises a Discrete Fourier Transform block circuit.

6. The system of claim 5, wherein the processor further comprises a padding circuit configured to pad the received image with blank content to match an aspect of the Discrete Fourier Transform circuit.

7. The system of claim 1, wherein each one-dimensional power spectral density processor circuit is further configured to calculate a power spectral density based upon luminance values of pixels in the content of the received image.

8. The system of claim 1, wherein the estimation circuit further comprises an averaging circuit configured to determine an average power spectral density for the horizontal dimension for the content of the received image and configured to determine an average power spectral density for the vertical dimension for the content of the received image.

9. The system of claim 1, wherein the estimation circuit further comprises a two-dimensional power spectral density calculation processor circuit.

10. The system of claim 1, wherein the plurality of standardized aspect ratios includes a standard-definition aspect ratio, a high-definition aspect ratio and a widescreen aspect ratio.

* * * * *